May 30, 1972        D. H. BENINGA        3,666,613

COMPOSITE CERAMIC-ORGANIC MATERIAL AND METHOD FOR MAKING SAME

Filed April 23, 1970

INVENTOR.
Duane H. Beninga
BY
Barnard, McGlynn & Reising
ATTORNEYS

United States Patent Office 3,666,613
Patented May 30, 1972

3,666,613
COMPOSITE CERAMIC-ORGANIC MATERIAL
AND METHOD FOR MAKING SAME
Duane H. Beninga, Arvada, Colo., assignor to Coors
Porcelain Company, Golden, Colo.
Continuation-in-part of application Ser. No. 563,785,
July 8, 1966. This application Apr. 23, 1970, Ser.
No. 31,341
Int. Cl. B32b 15/08, 25/02, 27/04
U.S. Cl. 161—168
15 Claims

ABSTRACT OF THE DISCLOSURE

In accordance with this invention there is provided an improved tough and wear resistant composite of hard ceramic bonded to rubber or other organic resin by means of a metalized layer on the ceramic which is bonded to the ceramic and to which the organic resin forms a bond thereby to greatly increase the bond strength between the ceramic and the resin.

---

This application is a continuation-in-part of application Ser. No. 563,785, filed July 8, 1966, now abandoned.

This invention relates to an improved composite of ceramic and organic resin material and to a method for manufacturing same. The invention finds particular utility for the manufacture of composites of ceramic and natural or synthetic rubber i.e. elastomers, and hence will be described in its particulars with reference thereto.

It has long been recognized that composites of rubber and ceramic should possess a combination of mechanical properties ideally suited for various types of manufacturing apparatus and articles of manufacture. Examples are vehicle tire treads, conveyor belts, linings for chutes, pipes and the like for conveying hard abrasive materials, and mill linings for the milling of abrasive materials. For all such articles it would be expected that the rubber would contribute flexibility, toughness and resilience together with moldability to enable inexpensive manufacture, and the ceramic would contribute extreme hardness and wear resistance. The difficulty, however, has been that until now it has not been possible to accomplish a sufficiently strong bond between the rubber and the ceramic in order to accomplish the desired marriage of the mechanical properties of the materials.

It is a principal object of the present invention to provide an improved rubber or other organic resin bonded ceramic wherein there is greatly improved bond strength between the organic resin and the ceramic. Another object of the invention is the provision of an improved coated ceramic material for the manufacture of rubber or other organic resin-ceramic composites. Still another object of the invention is an improved method for the manufacture of composites of ceramic and rubber or other organic resin.

Briefly, these objects are accomplished in accordance with the invention by providing substantially the entire exposed surface area of the ceramic desired to be bonded to the organic resin with a thin layer of metal which is chemically bonded to the ceramic and which forms an extremely strong bond with resin. Hence, the finished composite consists of rubber or other organic resin having bonded therein a piece or spaced discrete pieces of ceramic, each piece of ceramic having a chemically bonded outer metal surface to which the organic resin is bonded. As will be described in detail hereinafter, it is essential to the practice of the invention that the metal layer on the ceramic not be merely mechanically adhered to the ceramic but rather that it be chemically bonded to the ceramic composition. Without this feature only low bond strengths, on the order of those attainable by the direct bonding of rubber to ceramic, can be accomplished.

Figure 1:
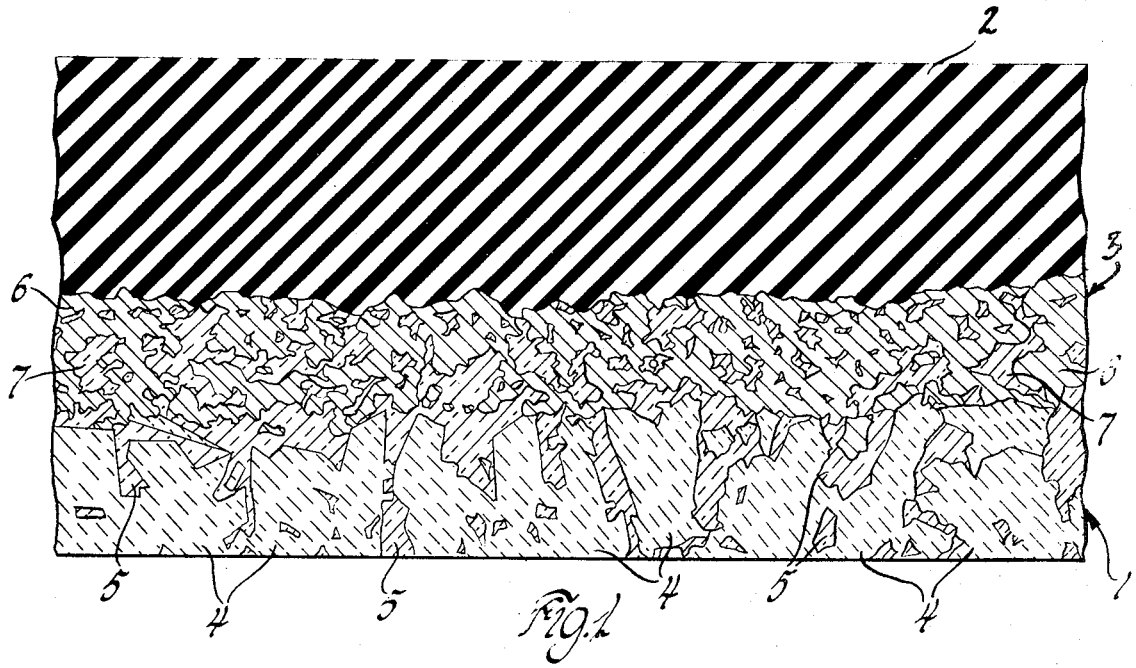
Figure 2:
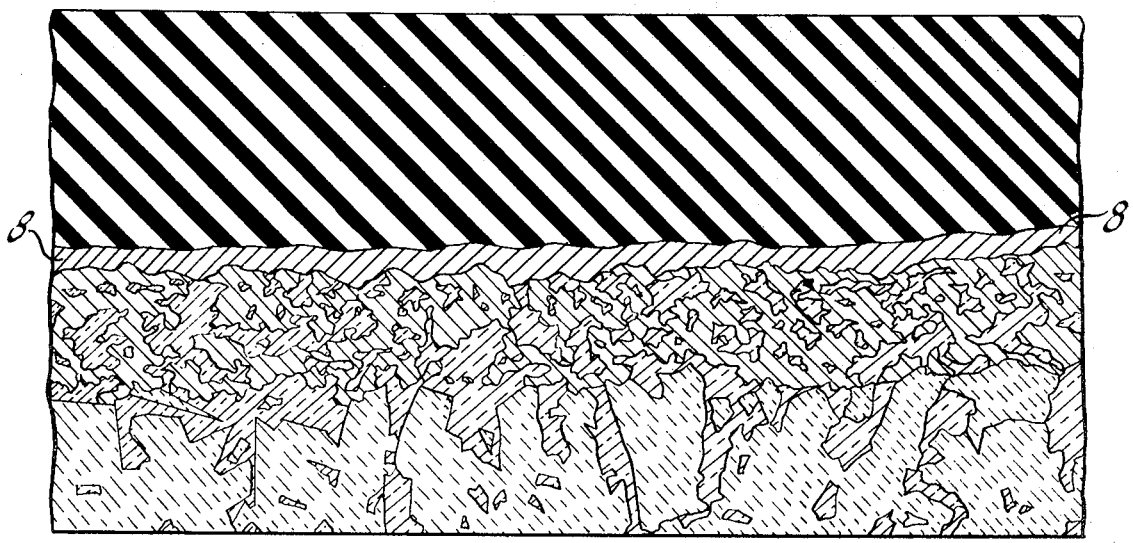

Other objects, features and advantages of the invention will appear more clearly from the following detailed description of preferred embodiments thereof and from the drawings in which:

FIG. 1 shows a magnified sectional view of a rubber-ceramic composite made in accordance with the invention; and FIG. 2 shows a similar view of another embodiment of the invention.

THE CERAMIC MATERIAL

By far the preferred ceramic for the practice of the invention is sintered aluminum oxide base ceramic. Such a ceramic contains at elast about 85% by weight aluminum oxide and the remainder small amounts of mineralizers or glass forming ingredients typical of which are silica, the silicates such as clay and talc, the alkali and alkaline earth oxides, carbonates, phosphates and the like such as the oxides, phosphates or carbonates of sodium, calcium, strontium and magnesium; and various other of the metal oxides such as chromium oxide, manganese oxide and the rare earth oxides well known in the art for their glass modifying or grain growth inhibiting effect when used in small amounts in high alumina ceramics. Examples of specific high alumina sintered ceramics are as follows, the percentages in each case being by weight: 100% aluminum oxide; 99.5% aluminum oxide, .5% chromium oxide; 94% aluminum oxide, 3% silica, 3% calcium oxide; 90% aluminum oxide, 5% silica, 3% magnesium oxide, 2% calcium oxide; 85% aluminum oxide, 10% silica, 3% calcium oxide and 2% magnesium oxide. In all of these examples where silica is present in the raw batch, either as such or in a combined form, the final ceramic structure after the sintering operation consists of a dense body of aluminum oxide crystals with an intercrystalline glassy phase. It should be understood that the above specific examples of high alumina ceramic formulations and of additive ingredients for the formulation thereof are only for purposes of illustration and the invention is not limited thereto since numerous other high alumina ceramic formulations are well known in the art and are in widespread commercial manufacture.

Such high alumina sintered ceramics are conventionally manufactured by (1) milling the raw batch ingredients, (2) forming the raw batch into shaped articles by any of various well known techniques, such as by admixing therewith an organic material, for example wax or a resin, as a temporary binder, and then isostatic or injection molding, and (3) subsequently firing the shaped pieces to sintering temperature which can be anywhere from about 1400° to 1950° C. In general, the higher the alumina content, the higher the temperature required for sintering to a dense non-porous body. As alluded to above, where silica is present, an intercrystalline glassy phase is formed during the sintering operation, this as a result of the interaction of the silica and other additive oxides, silicates, or the like with portions of the aluminum oxide. For reasons which will be discussed hereinafter, this glassy phase is desirable, though not essential, to the attainment of a good chemically bonded metalized surface on the ceramic for bonding thereof to the rubber.

Aluminum oxide base ceramic is preferred because of its extreme hardness and wear-resistance and because it is relatively tough and scratch-resistant as compared with other ceramics. Also, it can be and currently is manufactured in large commercial quantities at relatively low cost. But whereas high alumina ceramic is much preferred, other sintered metal oxide base ceramics can be used in the practice of the invention if desired. For example, sintered beryllium oxide base ceramics or zirconium oxide base ceramics, both well known in the art, can be used if desired though for most applications at no advantage as compared with aluminum oxide ceramic. Such ceramics are substantially the same, from the standpoint of formulation and methods of manufacture, as sintered alumina base ceramic except that the aluminum oxide is replaced by beryllia or zirconia, as the case may be. That is, beryllia or zirconia base ceramic can be either 100% of the metal oxide or upwards of about 85% of the metal oxide together with silica and/or other additions such as described with reference to alumina base ceramic.

The alumina or other ceramic used in the practice of the invention can be either in the form of bodies of predetermined shape, for example plates, rods, spheres or more complex shapes, or the ceramic can be random shaped chips or granules embedded in random orientation in the rubber. For most uses of the composition the individual ceramic pieces should, however, preferably be at least $\frac{1}{64}''$ in size. The use of extremely small granules, or powder, has a disadvantage in that the metalizing of the surface area thereof results in a relatively high proportion of metal in the overall composition thereby dissipating to some extent the advantages sought to be attained, i.e. the hardness and abrasion resistance provided by the ceramic. Some typical examples of ceramic shapes or pieces for use in the practice of the invention are as follows: alumina ceramic plates 6" x 6" x 1" for bonding to a rubber backing to serve as an abrasion and wear-resistant conveyor trough for metal ores or similar abrasive materials; plates of the same dimensions but formed to slightly arcuate shape for bonding to a rubber backing in a cylindrical grinding mill for grinding or milling abrasive materials; spheres of about ¼" diameter for bonded embedment in a rubber matrix to serve as a heavy-duty conveyor belt for conveying abrasive ores or the like; random shaped chips ranging in dimensions from about $\frac{1}{8}''$ to ¼" for bonded embedment in rubber to serve as a high traction tire tread for vehicle snow tires.

THE METAL LAYER

As indicated above, it is imperative to the attainment of a strong ceramic-to-rubber bond that the ceramic surfaces to which the rubber is to be bonded be provided with a metal layer which is chemically bonded to the ceramic. In effect then, at least the innermost surface of the metal layer enters into the composition and becomes a part of the ceramic surface. This chemical bonding of the metal layer to the ceramic can be accomplished in various ways, for example; (1) when the ceramic contains a glassy intercrystalline phase, by applying a metal powder or a mixture of metal powders, a portion of which oxidizes and enters into the glassy phase at the surface of the ceramic when the metal powder coated ceramic piece is heated to an elevated temperature in a wet reducing atmosphere; (2) where the ceramic does not contain an intercrystalline glassy phase, by coating the ceramic surface with a mixture of a powdered glass forming ingredient, preferably silica as such or in one of its combined forms, plus a metal powder or a combination of metal powders a portion of which oxidizes and enters into a glass phase which is formed on and becomes a part of the surface of the ceramic upon heating to elevated temperature in a wet reducing atmosphere by the interaction of the glass forming ingredient, the aluminum oxide or other metal oxide of the ceramic, and the metal; (3) irrespective of whether the ceramic does or does not contain an intercrystalline glassy phase, by coating the ceramic with a thin layer of metal which is highly reactive with the oxide of the ceramic thereby to form the desired chemical bond. The preferred metals for attaining the chemical bonding to the ceramic are molybdenum, tungsten, tantalum, niobium, chromium, titanium and zirconium. The latter two metals, titanium and zirconium, are important particularly for the third technique in that by reason of their great affinity for oxygen they form a chemical bond with aluminum oxide even in the absence of a glassy phase and even without requirement for heating. The aforesaid metals can be used alone but preferably in combination with each other or in combination with other metals. The metals can be used in their metallic form or as compounds which, upon heating in a controlled atmosphere, convert to the native metal. For example, lithium molybdate can be used such that upon heating in a wet reducing atmosphere, the compound breaks down and interacts with the ceramic surface, lithium oxide entering into the glass phase and molybdenum forming the chemically bonded metallic surface. As another example, titanium or zirconium hydride can be used. Upon firing in a dry reducing atmosphere, there is decomposition of the hydride to provide the native metal as the chemically bonded surface. As still another example, molybdenum oxide or tungsten oxide can be used instead of the native metal, the firing in a wet reducing atmosphere resulting in a chemically bonded layer of the native metal. Where the aforesaid metals, or their compounds, are used in combination with other metal, the other metal can likewise be incorporated into the coating composition in compound form rather than in native form. Where molybdenum, tungsten, tantalum, niobium or chromium is used, it can advantageously be used in combination with manganese, or iron or the oxides thereof, the combination being fired in a wet reducing atmosphere. The following examples will serve to illustrate:

EXAMPLE I

A sintered high alumina ceramic body consisting of about 96% aluminum oxide and having an intercrystalline glassy phase is coated with a mixture of about 80% molybdenum powder and 20% manganese powder with a particle size less than about 10 microns. A small amount of a suitable organic binder, for example collodion, is mixed with the metal powder to form a paint or slurry for application to the ceramic piece. After the slurry dries, the coated ceramic piece is fired to about 1300° C. to 1600° C. in a hydrogen or other reducing atmosphere containing water vapor, for about from 5 to 60 minutes. In the course of this firing operation the organic materials are vaporized away, and the layer of metal is chemically bonded to the ceramic. In the course of the firing at least some of the metal actually enters into the glassy phase at the surface of the ceramic.

EXAMPLE II

A ceramic piece of about 100% sintered aluminum oxide is coated with a mixture of about 80% molybdenum powder, 10% manganese powder, and 10% silica, the grain size again being less than about 10 microns and some collodion or other liquid organic binder being included to form a paint for easy application of the material to the ceramic. The coated ceramic piece is then fired as described above in a wet reducing atmosphere. The resultant metal layer is chemically bonded to the ceramic by reason of the interaction of the silica, some of the metal (including substantially all of the manganese which coverts to its oxide) and the alumina at the surface of the ceramic piece. This metalizing composition and technique, as well as others, can be used to provide a chemically bonded metal layer on other metal oxide base ceramics, for example sintered beryllium oxide base ceramic or sintered zirconium oxide base ceramic.

EXAMPLE III

A ceramic piece containing about 90% aluminum oxide and having a glassy intercrystalline phase is coated with a mixture of about 3% titanium powder, 43% lead powder, and 54% copper powder all of 10 microns or less particle size. Collodion or other liquid organic binder is again used as a temporary binder for adhering the powder to the ceramic piece. The coated ceramic piece is then fired at about 800°–1000° C. for from 5 to 15 minutes in a dry reducing or inert atmosphere. The resultant metal layer is chemically bonded to the ceramic by reason of the high reactivity of the titanium with the oxide of the ceramic.

EXAMPLE IV

A ceramic piece containing 99.5% aluminum oxide and .5% chromium oxide and having substantially no glassy phase is coated with titanium or zirconium by physically abrading the titanium or zirconium metal against the ceramic surface such that the metal is rubbed off as an extremely thin layer on the surface of the ceramic. By reason of the extreme reactivity of the metal, it chemically bonds to the aluminum oxide.

Where the ceramic contains a glassy phase or where the metal coating composition is formulated with a glass former such as silica to form a glassy phase in the metalizing operation, any of various glass modifiers can be included in the metalizing composition if desired. For example, lithium compounds such as the aforesaid lithium molybdate, or lithium carbonate can be included in small amounts as can other of the alkaline metal or the alkaline earth metal oxides, carbonates, silicates or the like. Except where the metal applied consists of or includes titanium or zirconium, the desired chemical bonding of the metal layer to the ceramic is preferably always attained by means of a glassy phase at least at the surface of the ceramic, this glassy phase being both a part of the ceramic body and a part of the metal layer. The thickness of the chemically bonded metalized layer preferably should not exceed .002".

With the chemically bonded metalized layer applied, it is then possible to bond the rubber or other resin directly to this metalized layer and attain excellent bond strength. However, it is sometimes desirable to apply to the initial chemically bonded metal layer a thin layer of some other metal characterized by its ability to form an exceptionally strong bond with the resin. For example, it is well recognized in the rubber bonding art that brass forms an exceptionally strong bond with rubber. Hence, if in a particular application a brass surface is desired on the ceramic it is a simple matter to apply the brass layer, as by plating, to the initially metalized ceramic piece. Any of various other metals can likewise be plated over the chemically bonded initial metalized layer to suit the particular needs of the resin to be used in forming the final composite article. What I have discovered, however, and what bears emphasis here, is that the key to the attainment of a good bond between the rubber or other resin and the ceramic is not merely the coating of the ceramic with a metal selected for its bonding properties with the resin, but rather the coating of the ceramic with a metal layer which chemically bonds to the ceramic composition, the choice of metal being predicated not on accomplishing optimum bond strength between the metal and the resin but rather on accomplishing optimum bond strength between the metal and the ceramic. Further, I have discovered that irrespective of which metal or mixture of metals is used for the chemically bonded metal layer, excellent bond strength can be accomplished between this metal layer and the rubber or other resin and if still additional bond strength between the resin and the metal layer is desired, such should be accomplished by plating or otherwise coating a second metal layer over that bonded to the ceramic. To exemplify, if a ceramic piece is initially metal coated as for example by the application of a molten layer such as brass or by chemically plating with copper, silver or the like, and such coated ceramic is then bonded to rubber, only a low bond strength is accomplished—on the order of the bond strength which can be attained by bonding the rubber directly to the ceramic. With such a metal layer the bond strength is generally proportional to the porosity of the ceramic since adherence of the metal to the ceramic is dependent upon a purely mechanical interlock between the two materials. As distinguished from this, and in accordance with the present invention, if the metal layer on the ceramic is chemically bonded to the ceramic such as described in the above examples, extremely high bond strength with rubber can be accomplished even where the ceramic is non-porous and is smooth and where the composition of the metalized layer is not selected on the basis of its specific ability to form a strong bond with rubber.

THE RUBBER COMPOSITION AND BONDING

The term "rubber" as used herein is intended to comprehend not only natural rubber but also all the various synthetic rubbers, i.e. elastomers, well known in the art, for example, butyl rubber, polychloroprene or polyurethane. To attain the rubber-to-metalized ceramic bond, it is simply a matter of vulcanizing or curing the rubber in pressured contact with the metalized ceramic pieces using techniques conventionally used in the rubber art for bonding rubber. Hence, employing techniques well known in the rubber manufacturing art, the metalized ceramic pieces, be they random shaped granules or chips, or preformed spheres or the like, can be admixed into the rubber formulation and the mixture then molded and vulcanized. Where the ceramic pieces are desired only at the surface of the rubber article, the ceramic pieces, for example plates with the rubber-contacting surfaces thereof metalized, can be pressed or embedded into the unvulcanized rubber sheet or other article and the rubber then vulcanized thereby to attain the strong bond between the rubber and the metalized ceramic.

FIG. 1 of the attached drawing shows a magnified cross-sectional view of the interface between the bonded rubber and the ceramic where, as in the preferred embodiments, the ceramic has a glass phase. In this figure, 1 is the ceramic, 2 is the rubber and 3 is the metalized layer which is chemically bonded to the ceramic. In the ceramic, the alumina crystals as shown at 4 have an intercrystalline glass phase 5 therebetween and the metal layer has metal particles 6 and a glass phase 7 which is a continuation of the glass phase 5 of the ceramic and to which the metal 6 is bonded. In FIG. 2 of the drawings a similar structure is shown but in this case a second metal layer 8, preferably of brass, is plated over the metal layer 3 to thereby attain a still further increase in bond strength due to the marked ability of the metal layer 8 to form a strong bond with the rubber. It will be noted from these drawings that the surface of the ceramic is not porous. Of course the ceramic pieces can be porous if desired; however, the attainment of good bond strength in accordance with the present invention is not dependent upon porosity.

A standard test which can be used to test the bond strength between ceramic and rubber consists of bonding to rubber a plate of ceramic of predetermined size, say 1" wide, and then applying a pulling force to one edge of the rubber and determine how many pounds of pulling force are required to peel the rubber away from the ceramic. Using the best bonding techniques available prior to the present invention, the maximum pulling force which could be exerted to the edge of a 1" wide ceramic plate before the rubber peeled away from the plate was about 70 pounds. As compared with this, using the bonding structure and method of the present invention, the pulling force applied to the edge of a 1" wide ceramic plate before the rubber tore away from the ceramic was 130 pounds and on inspection it was found that the failure occurred by reason of the rubber tearing rather than by reason of the ceramic plate peeling away from the rubber. To date, the maximum strength of the bond accomplished in accordance with the present invention has not yet been determined since in the tests failure has occurred in the rubber rather than in the bond between the rubber and the metalized ceramic.

In addition to providing rubber-ceramic composite articles having excellent bond strength between the rubber and the ceramic, the invention finds utility in accomplishing strong composites of ceramics with other types of organic resins, i.e, solid organic polymers, which otherwise form only a weak bond with ceramic. Examples are polyethylene, polyvinyl chloride and polycarbonate resin such as Delrin.

Hence, it will be understood that whereas the invention has been described in detail with reference to preferred embodiments thereof, various changes and modifications may be made all within the full and intended scope of the claims which follow.

The embodiments of the invention in which an exclusive property or privilege is claimed are defined as follows:

1. An organic resin-ceramic composite comprising at least one ceramic body bonded to an organic resin through an intermediate deposit of titanium, said ceramic body containing at least about 85% by weight aluminum oxide.

2. An organic resin-ceramic composite comprising at least one ceramic body bonded to an organic resin through an intermediate deposit of zirconium, said ceramic body containing at least about 85% by weight aluminum oxide.

3. An organic resin-ceramic composite comprising at least one ceramic body bonded to an organic resin through an intermediate deposit of molybdenum, said ceramic body containing at least about 85% by weight aluminum oxide.

4. A composite article comprising an organic resin having bonded thereto at least one body of ceramic having a glassy phase at least at the surface thereof, said article being made by a method including the steps of applying to the surfaces of the ceramic body a thin layer of a composition comprising at least one metal selected from the group consisting of molybdenum, tungsten, tantalum, niobium, chromium, titanium and zirconium, firing the body thereby to provide a layer of metal on said body bonded to said glassy phase on the surface of said ceramic, and thereafter bonding said organic resin to said metal layer.

5. A composite article as set forth in claim 4 wherein said ceramic has said glassy phase prior to applying said thin layer.

6. A composite article as set forth in claim 5 wherein said thin layer applied to the ceramic body comprises lithium molybdate and wherein said body is fired in the wet reducing atmosphere until the lithium enters into the glassy phase at the surface of the ceramic and the molybdenum forms a network of sintered molybdenum metal particles embedded in the glassy phase.

7. A composite article as set forth in claim 4 wherein said composition applied to the surface of the ceramic includes a glass forming ingredient which provides the glassy phase on the surface of said ceramic during said firing.

8. A composite article as set forth in claim 4 wherein said ceramic body is a sintered ceramic body containing at least 85% by weight metal oxide selected from the group consisting of aluminum oxide, beryllium oxide and zirconium oxide.

9. A composite article as set forth in claim 4 wherein there are a plurality of said ceramic bodies each having said layer of metal and wherein said resin is a matrix in which said bodies are embedded.

10. A composite article as set forth in claim 9 wherein said bodies are of geometrical shape.

11. A composite article as set forth in claim 9 wherein said bodies are random shaped chips or granules.

12. A method for manufacturing a composite of organic resin having bonded thereto at least one body of ceramic containing at least about 85% by weight aluminum oxide and having a glassy phase at least at the surface thereof, said method comprising the steps of applying to the surface of the ceramic body a thin layer of a composition comprising at least one metal selected from the group consisting of molybdenum, tungsten, tantalum, niobium, chromium, titanium and zirconium, firing the body thereby to provide a layer of metal on said body bonded into said glassy phase on the surface of said ceramic, and thereafter bonding said organic resin to said metal layer.

13. A method as set forth in claim 12 wherein said ceramic has said glassy phase prior to applying said thin layer.

14. A method as set forth in claim 13 wherein said thin layer applied to the ceramic body comprises lithium molybdate and wherein said body is fired in the wet reducing atmosphere until the lithium enters into the glassy phase at the surface of the ceramic and the molybdenum forms a network of sintered molybdenum metal particles embedded in the glassy phase.

15. A method as set forth in claim 12 wherein said composition applied to the surface of the ceramic includes a glass forming ingredient which provides the glassy phase on the surface of said ceramic during said firing.

References Cited

UNITED STATES PATENTS

| | | | |
|---|---|---|---|
| 2,171,438 | 8/1939 | Tarbox | 156—114 |
| 2,618,572 | 11/1952 | Parrish | 118—76 |
| 2,806,509 | 9/1957 | Bozzacco et al. | 161—161 |
| 3,023,492 | 3/1962 | Bristow | 117—23 |
| 3,208,190 | 9/1965 | Kakos et al. | 161—206 |
| 3,319,392 | 5/1967 | Fitzgerald | 52—389 |
| 3,335,048 | 8/1967 | Morain | 161—38 |
| 3,377,176 | 4/1968 | Wolkodoff et al. | 106—46 |

JOHN T. GOOLKASIAN, Primary Examiner

G. W. MOXON II, Assistant Examiner

U.S. Cl. X.R.

117—27, DIG. 1; 152—210; 156—89, 114, 298, 299; 161—39, 40, 162, 216, 217, 225